United States Patent [19]
Labeaute et al.

[11] Patent Number: 5,125,074
[45] Date of Patent: Jun. 23, 1992

[54] PROCESS FOR ELIMINATING HIDDEN FACES FOR SYNTHESIS OF A THREE-DIMENSIONAL WIRE IMAGE

[75] Inventors: Philippe Labeaute, Le Haillan; Eric Pierre, Bordeaux Cauderan, both of France

[73] Assignee: Thomson-CSF, Puteaux, France

[21] Appl. No.: 391,960

[22] Filed: Aug. 10, 1989

[30] Foreign Application Priority Data

Aug. 10, 1988 [FR] France ................ 88 10787

[51] Int. Cl.$^5$ ............................................ G06F 15/72
[52] U.S. Cl. ................................. 395/121; 395/127; 395/134; 340/739
[58] Field of Search .............. 364/522, 521; 340/729, 340/739, 723, 747; 395/121, 127, 143, 134

[56] References Cited

U.S. PATENT DOCUMENTS

| | | | |
|---|---|---|---|
| 4,594,673 | 6/1986 | Kelly et al. ................ | 364/522 |
| 4,847,789 | 7/1989 | Holly .......................... | 364/522 |
| 4,855,938 | 8/1989 | Gonzalez-Lopez et al. ........ | 364/522 |
| 4,901,252 | 2/1990 | Fitzgerald et al. ............ | 364/522 |
| 4,924,414 | 5/1990 | Ueda ........................... | 364/522 |

FOREIGN PATENT DOCUMENTS

| | | |
|---|---|---|
| 167880 | 1/1986 | European Pat. Off. . |
| 2406927 | 10/1978 | France . |
| 86/00454 | 1/1986 | PCT Int'l Appl. . |

*Primary Examiner*—Gary V. Harkcom
*Assistant Examiner*—Raymond J. Bayerl
*Attorney, Agent, or Firm*—Oblon, Spivak, McClelland, Maier & Neustadt

[57] ABSTRACT

A process for eliminating hidden faces for synthesis of a three-dimensional wire image from the set of edges of a wire image, the edges being provided with priority parameters making it possible to restore the appearances of a third-dimension. The process consists of:

cutting the set of ordinate values into intervals [Y(i),Y(i+1)] as a function of the ordinates of the edge ends;

determining, in each interval [Y(i),Y(i+1)], the coordinates of intersection points (I1 ... I4) of the edges;

making, for each edge (AB), an arranged list of points of intersection of this edge with more priority edges;

determining, for each intersection point (I1 ... I4), the value of an indicator indicating whether the facet of the most priority edge masks the least priority edge, starting from the intersection point considered, or masks it before the intersection point considered or else masks it before and after the intersection point;

determining, for first end (A) of each edge, the number of facets that mask this first end;

determining the segments of this edge that are visible and those that are hidden, by determining the number of facets that mask each segment, from the number of facets that mask first end (A) of the edge, and from the values of the indicators for intersection points (I1 ... I4) of this edge (AB) with more priority edges.

7 Claims, 9 Drawing Sheets

PROCESS FOR ELIMINATING HIDDEN FACES FOR SYNTHESIS OF A THREE-DIMENSIONAL WIRE IMAGE

BACKGROUND OF THE INVENTION

1. Field of the Invention

The invention relates to a process of elimination of hidden faces for the synthesis of a three-dimensional wire image. Such an image is displayed on a two-dimensional display device, for example a cathode tube, and represents an object or a symbol apparently having three dimensions. The image consists of polygonal facets, some of which are partially or completely masked by facets closer to the observer, to give the impression of a third dimension. Each facet can be plotted on the screen either by illuminating its surface, the image is then called surface, or by illuminating only the edges of the facet, the image is then called wire or iron wire.

2. Discussion of Background

Conventionally, a wire image is displayed on a cathode tube by a direct beam, consisting in deflecting the electron beam only to scan the edges and edge segments which are to be illuminated, restarting all the calculations for each displayed image.

Synthesis of wire images is less common than synthesis of surface images, but it offers a considerable advantage when the display device is a cathode ray tube. Actually, the electron beam of this tube is deflected to scan only the edges of the image, which makes it possible to obtain a great brightness even if the image bas a very great resolution. The synthesis of wire images most commonly made is bidimensional. The three-dimensional synthesis poses the problem of eliminating edge parts that must be hidden to restore the three-dimensional appearance.

SUMMARY OF THE INVENTION

The object of the invention is to propose a process for eliminating hidden faces for the synthesis of a three-dimensional wire image, whose use is to be fast enough to make possible a synthesis in real time. The process according to the invention makes it possible very quickly to detect the intersection points of edges and to determine which edge segments are actually visible. It can be used by a general purpose microprocessor, now available on the market, without requiring any particular equipment such as an image memory. Its rapidity of use flows particularly from the way of determining the edge intersection points, which prevents the amount of calculations from increasing exponentially with the number of edges.

According to the invention, a process for eliminating hidden faces for synthesis of a three-dimensional wire image, on a two-dimensional display, the image consisting of facets, each facet being constituted by edges, each represented by the coordinates of its ends and by the value of its slope, in a Cartesian system of coordinates constituted by two coordinate axes, each point of an edge being provided with a priority parameter corresponding to a third dimension;

is characterized in that it consists in:

determining the intersection points of all edges, by:

cutting the set of ordinate values into intervals [Y(i),Y(i+1)] so that each bound is the ordinate value of an edge end and so that no ordinate of the edge end is in these intervals;

determining, for each interval [Y(i),Y(i+1)], the coordinates of the intersection points of edges whose ordinates are in this interval;

constituting, for each edge, a list of the intersection points of this edge with other edges of higher priority, this list being arranged according to the position of the points of intersection between a first and second edge end;

determining, for each intersection point, the value of an indicator indicating if the facet of the priority edge masks the edge of least priority, based on the intersection point considered; or masks it before the intersection point considered; or else masks it before and after the intersection point; each edge being scanned from a first to a second end;

determining, for the first end of each edge, the number of facets that mask this first end;

determining, for each edge, the segments of this edge that are visible and those that are hidden, by determining the number of facets that mask each segment, based on the number of facets which mask the first end of the edge, and based on the values of the indicators for the points of intersection of this edge with most priority edges.

BRIEF DESCRIPTION OF THE DRAWINGS

The invention will be better understood and other details will come out from the following description and the accompanying figures.

DETAILED DESCRIPTION OF THE PREFERRED EMBODIMENT

The synthesis of a three-dimensional wire image comprises several steps of which elimination of the hidden faces is only one step among others. The synthesis consists first in extracting data from a data base to determine the facets which will represent an object in wire form; then in performing a geometric transformation on each of the facets to place it in a Cartesian system of coordinates which is that of the observer of the synthesis image and no longer in the system of coordinates corresponding to the view or to the calculations made to constitute the data base. Then a cutting is performed to eliminate the facets or parts of facets that will be outside the observer's field of vision, this field having the shape of a pyramid whose vertex is the observer's eye; then a projection of the facets on the display plane is achieved by a homothetic transformation whose ratio is a function of the distance between the observer and the point to be projected on the screen, and as a function of the distance between the observer and the screen; then the hidden parts of the facets are eliminated by eliminating certain edge segments, then the image is displayed on a display device, by calculating the actuating signals corresponding to each edge segment that is to be lit up on the screen.

Only the step of elimination of the hidden faces is described below, because the other steps are well known.

Figure 1:
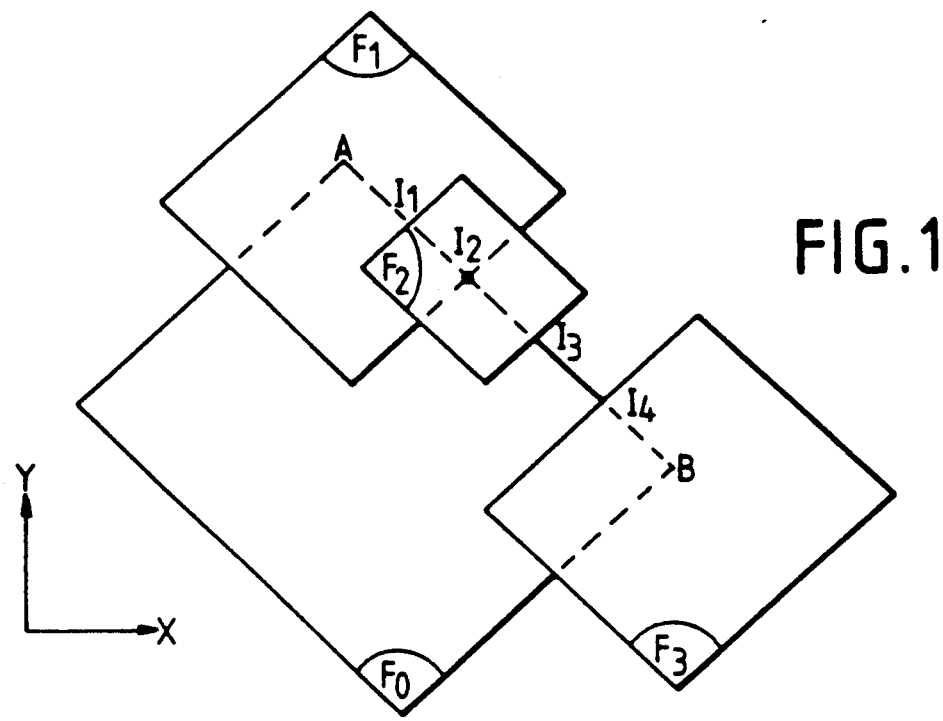
FIG. 1 diagrammatically represents an example of a three-dimensional wire image.

FIG. 1 diagrammatically represents an example of a three-dimensional wire image in which an object is represented by four facets FO . . . F3 each comprising four edges. In this example it is desired that the facets appear successively closer to the observer in the order FO . . . F3. The three-dimensional appearance is given by eliminating certain segments of edges that are hidden by a facet that is to be represented as being closer to the observer. For example, edge AB of facet FO comprises two segments that are masked, AI3 and I4B.

Various known processes can be used to express, by a parameter value, the priority of a facet relative to a point of another edge of another facet. The value of the priority parameter of a point can be constituted by the value of a coordinate of this point on an axis of coordinates facing the observer. Or else, the value of the priority parameter can be constituted by a value uniform for all points of all edges of the same facet, and increasing as a function of the priority ascribed to the facet. In the following description, the priority parameter is assumed to be of the latter type, but this in no way limits the application of the process according to the invention.

Use of the process according to the invention to determine the hidden parts of all the edges of an image comprises four main parts.

A first part consists in determining all the edge intersection points of the image.

In this example, the first part of the process determines particularly intersection points I1, I2, I3, I4, of edge AB with the edges of the other facets: F1 . . . F3.

A second part consists in: determining the value of an indicator for each intersection point of the image, this indicator indicating if the facet of the most priority edge masks the least priority, based on the intersection point considered; or masks it before the intersection point considered; or else, masks it before and after the intersection point, each edge being scanned from a first to a second end.

In this example, the second part of the process determines, particularly, that the first end, A, of edge AB, is masked by a facet F1; then, by scanning the edge in direction AB, determines the value of an indicator for each intersection point I1, I2, I3, I4.

The indicator determined for intersection point I1 indicates that facet F2, one of whose edges creates intersection I1, masks edge AB from I1. The indicator determined for intersection point I2 indicates that facet F1, one of whose edges creates intersection I2, masks edge AB before I2 but not after. The indicator determined for intersection point IS indicates that facet F2, one of whose edges creates intersection IS, masks edge AB before IS but not after. The indicator determined for intersection point I4 indicates that facet F3, one of whose edges creates intersection I4, masks edge AB after I4.

A third part of the process according to the invention consists in determining, for the first end of each edge, the number of facets that mask this first end. In this example, the number of facets masking the first end, A, of edge AB, is equal to 1.

A fourth and last part of the process according to the invention then consists in determining, for each edge, the segments that are visible and those that are hidden by determining the number n of facets that mask each segment. This number n is calculated from the number of facets that mask the first end of the edge and from the values of the indicators mentioned above. If n is not zero, the segment should not be displayed.

In this example, the number of facets masking end A of edge AB is equal to 1, therefore segment AI1 is masked by a facet, n=1, therefore it should not be displayed. At intersection point I1, the indicator corresponding to I1 indicates that facet F2 begins to mask edge AB, the number n is then incremented by one unit, n=2, which conveys that edge AB is masked beyond I1, by facet F2, while continuing to be masked by facet F1. The next intersection point is point I2. Segment I1I2 therefore is masked by two facets, F1 and F2. Therefore it should not be displayed.

The next intersection point is I3. Its indicator indicates that facet F1 no longer masks edge AB beyond point I2, number n is then decremented by one unit, n=1, which conveys that facet F2 continues to mask edge AB beyond point I2. Therefore, segment I2I3 is masked by one facet, F2, and should not be displayed.

The next intersection point is I3. Its indicator indicates that facet F2 does not mask edge AB beyond point IS. Number n is then decremented by one unit, n=0. Consequently, no facet masks edge AB from I3 to the next intersection point, I4. Segment I3I4 is not masked; therefore it should be displayed on the screen.

At point I4, the indicator indicates that edge AB is masked beyond point I4 by facet F3, number n is then incremented by one unit, n=1. Edge AB does not comprise other points of intersection with other edges. Consequently, the second end of edge AB is located inside facet F3 and the latter therefore masks segment I4B. This segment therefore should not be displayed on the screen.

This very simple example shows the role of indicators and brings out the notion of the order of intersection points along each edge.

Figure 2:
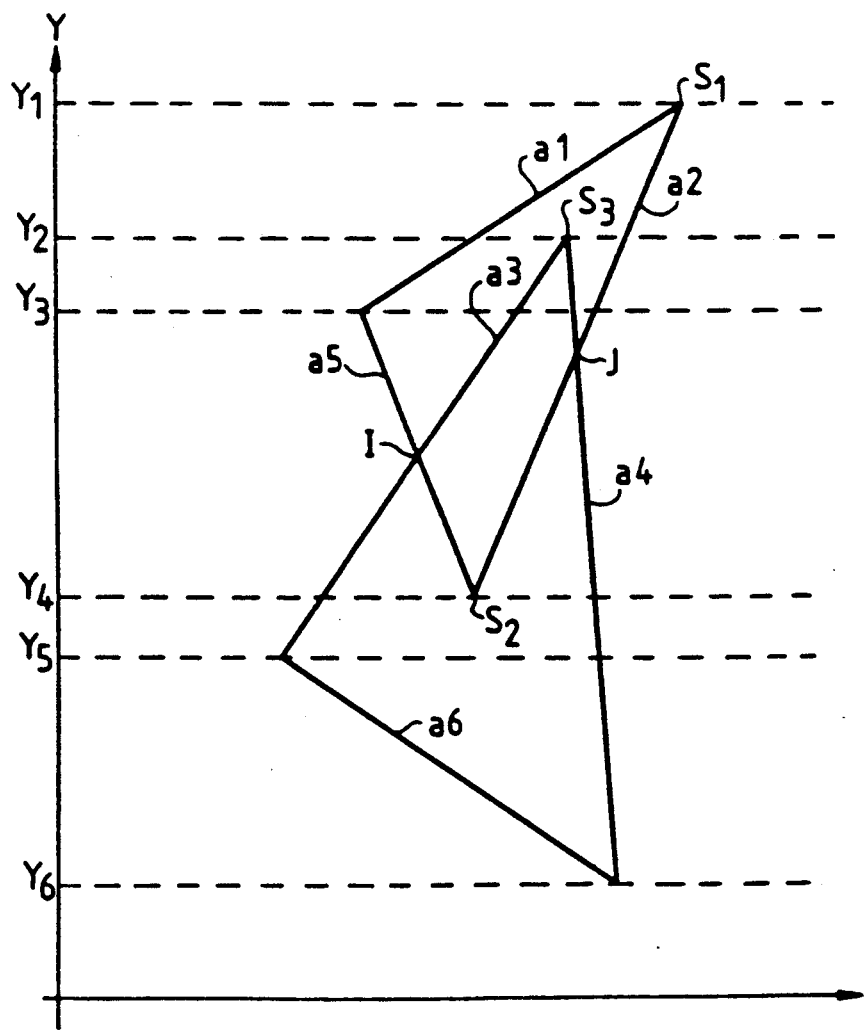
FIG. 2 illustrates a first step of using the process according to the invention, consisting in cutting the set of ordinate values into intervals [Y(i),Y(i+1)]

FIG. 2 illustrates, on a very simple example, a first step in determining all intersection points of edges in an image. Each point of the image is located by its coordinates (x,y) in a Cartesian system of coordinates constituted by a horizontal axis ox and a vertical axis oy, whose origin is at the bottom and left of the screen. Each edge is defined by: the coordinates of a first end, the coordinates of a second end, and by its slope, the latter being defined as the ratio of the variation of abscissa x to the corresponding variation of ordinate y. With such a definition of the slope, the so-called horizontal edges, which have a constant ordinate, have an infinite slope.

In the following, any edge whose points have the same ordinate value is called a horizontal edge. By convention, the first end of an edge, also called the beginning of an edge, is the one having the maximum ordinate, if the edge is nonhorizontal; and it is the one having the minimal abscissa when the edge is horizontal. The second end of an edge, also called the end of an edge, is the end having the minimal ordinate if the edge is nonhorizontal, and it is the one having the maximum abscissa if the edge is horizontal.

The first step in determining the intersection points of all the edges of an image consists in cutting the set of ordinate values into intervals [Y(i),Y(i+1)] so that each bound of these intervals has the ordinate value of an edge end and no edge end ordinate is in these intervals. In FIG. 2, the image example consists of two partially superposed triangular facets. The six edge ends of these facets have for ordinates: Y1 ... Y6, decreasing in this order.

A second step in determining all the intersection points of the image consists in considering successively the intervals: [Y1,Y2], [Y2,Y3], [Y3,Y4], [Y4,Y5], [Y5,Y6], by detecting the existence of the intersection points located in each interval [Y(i),Y(i+1)]. The intervals are considered in the order of decreasing ordinates, in this example. In the example represented in FIG. 2, all the edges can be considered systematically by successively scanning ordinate lines Y1, Y2, Y3, Y4, Y5, Y6 and only these lines. The process consists in determining the existence of intersection points before searching for their coordinates. This is faster because the resolution of a system of equations to determine a possible point of intersection for each pair of edges could cause a loss of time for each pair of edges not having an intersection. In this example, there are two intersection points, I and J, whose existence is determined during the search for the intersection points in interval [Y3,Y4].

Figure 3:
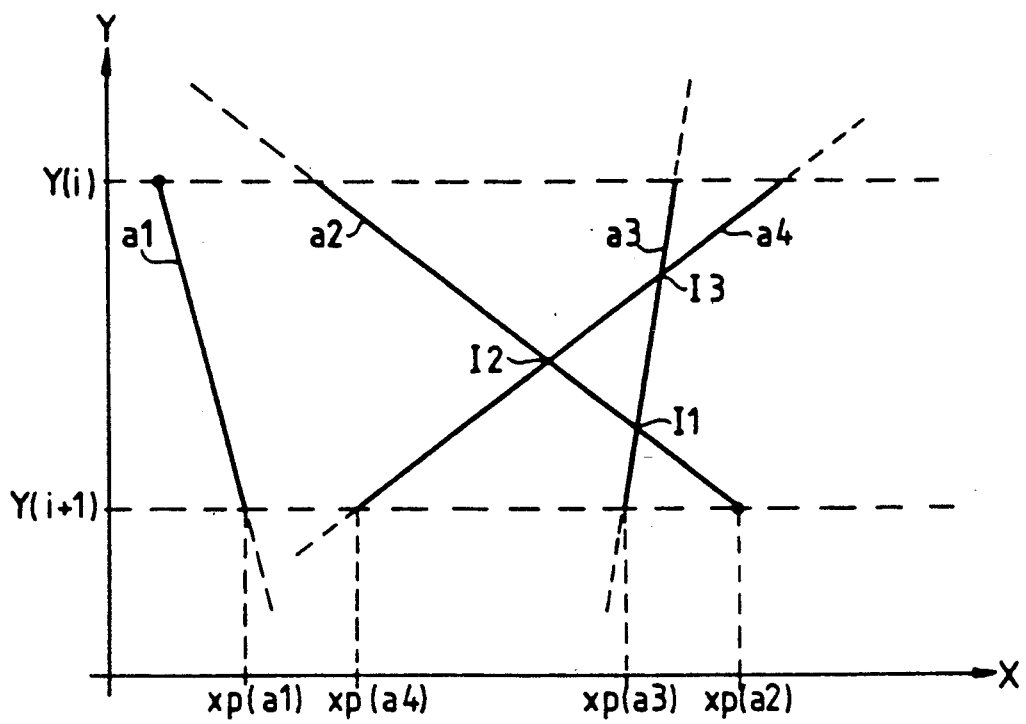
FIGS. 3 and 4 illustrate the determination of the intersection points in an interval.
Figure 4:
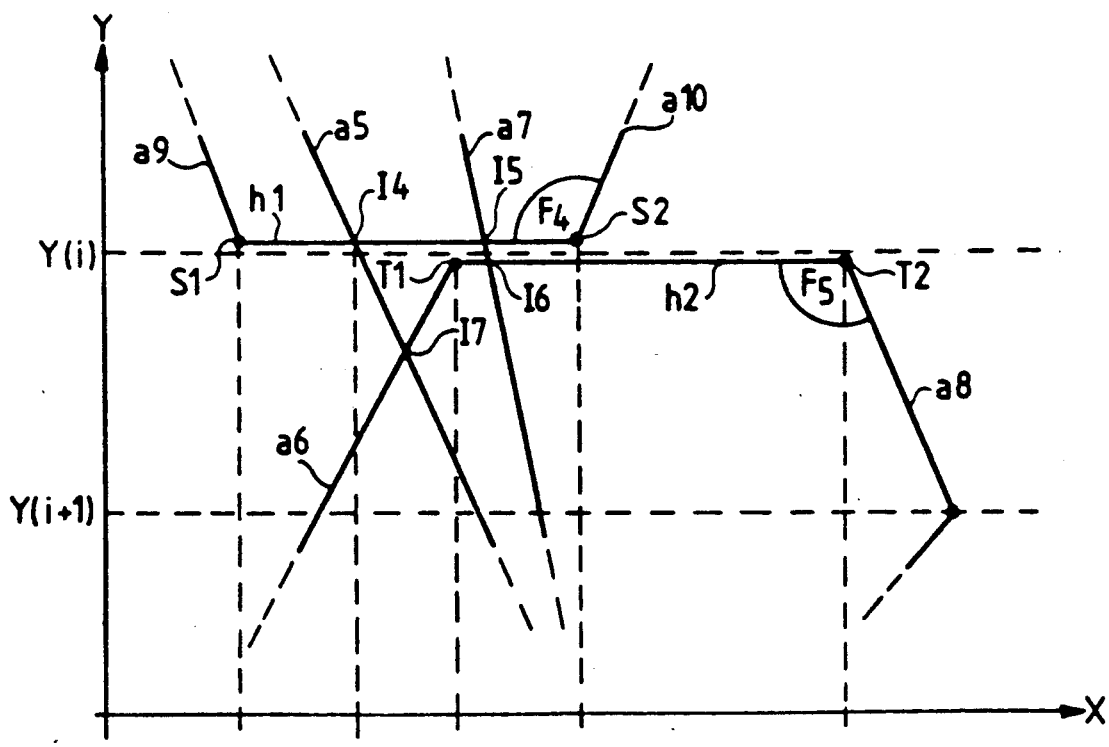

For greater clarity, FIG. 3 illustrates, by a very simple example, the detection of the existence of intersection points, while FIG. 4 illustrates this detection by a more complicated example which corresponds to the general case.

In this FIG. 3, four nonhorizontal edges, a1, a2, a3, a4, are capable of having intersection points inside an interval [Y(i),Y(i+1)]. The process consists in considering only the edges, called active, on current line Y(i), i.e., able to have an intersection in the interval considered; and in making a list, L-act(Yi), arranged as a function of the abscissas of the points, called passage points, on the current line, which are the points that these edges have with respect to ordinate Y(i). Secondarily, this list is arranged according to increasing slopes, when several nonhorizontal edges have the same passage point, or the same beginning, on ordinate line Y(i).

In this example, the passage points of the edges on the current line have abscissas increasing in the order: a1, a2, a3, a4.

L-act(Yi)=a1, a2, a3, a4.

It should be noted that, in this example, edge a1 has its beginning located at ordinate Y(i) and that this point constitutes its passage point to ordinate Y(i).

The process then consists in considering the passage points of these edges on ordinate line Y(i+1), by making a second list of the same edges but arranged as a function of the abscissas of the passage points of these edges on ordinate line Y(i+1). These abscissas can be calculated from the value of the coordinates of the ends of the edges and from their slope. In this example, the abscissas of the passage points of the edges a1, a2, a3, a4, on ordinate line Y(i+1) are respectively: xp(a1), xp(a2), xp(a3), xp(a4). The list of these abscissas arranged according to increasing values is: xp(a1), xp(a4), xp(a3), xp(a2). The second list of edges is marked L-pas-(Y(i+1)). In this example, L-pas(YIi+1))=a1, a4, a3, a2.

A comparison of list L-pas(Y(i)) and list L-act(Y(i+1) shows that there is a permutation of the order of passage points of certain edges, and makes it possible to detect the existence of intersection points. The permutation of a3 and a2 indicates the existence of an intersection point I1 between edges a3 and a2. The permutation of the order of a4 and a2 indicates the existence of an intersection point I2 between edges a4 and a2. The permutation of the order of a4 and a3 indicates the existence of an intersection point IS between edges a4 and a3. Edge a1 has kept its place relative to the other edges, consequently there is no intersection between edge a1 and the other active edges on the current line considered.

FIG. 4 illustrates the detection of the existence of intersections in a more general case where there are also intersections between a horizontal edge and a nonhorizontal edge, or else between two horizontal edges. In this example, a facet F4 has a horizontal edge h1 having a first and second end, S1 and S2, on ordinate line Y(i), and a second facet F5 has a horizontal edge h2 having two ends, T1 and T2, located on ordinate line Y(i). Facet F4 is located entirely above this line when facet F5 is located entirely below this line, while their edges h1 and h2 have a common segment T1S2.

In such a case, the two edges, h1 and h2, are treated as two totally independent edges. On the other hand, in case two facets have a common edge, over its entire length, the process consists in considering only one edge. Each edge is associated with a list of facets to which it belongs, to be able to find these facets quickly.

The process consists in making a first list, L-act(Y(i)), of edges able to have intersection points in interval [Y(i),Y(i+1)], including the value Y(i). Facet F4 comprises an edge able to have such intersection points; it is edge h1. On the other hand, edges a9 and a10 of facet F4 are not considered as active. They end on ordinate line Y(i), they therefore are not able to have intersection points inside the interval. Facet F5 comprises three edges able to have intersection points in the interval and on its bound Y(i); they are: a2, a6, a8. Further, in this example, two nonhorizontal edges, a5 and a7, have a passage point on ordinate line Y(i). Edge a5 intersects only edge h1. Edge a7 intersects the common part of edges h1 and h2.

Horizontal edges h1 and h2 have an infinity of passage points on straight ordinate line Y(i). List L-act(Y(i)) is then made by representing horizontal edge b1 by its end S1 and by its end S2, and by representing horizontal edge h2 by its end T1 and by its end T2, by arranging the nonhorizontal edges according to the abscissas of their passage point on ordinate line Y(i) and by arranging the ends of the horizontal edges according to the abscissas of these ends.

L-act(Y(i))=S1, a5, a6, T1, a7, S2, T2, a8.

In practice, each symbol of this list is provided with a marker able to take three values, to indicate if the symbol designates: a nonhorizontal edge; a beginning of a horizontal edge; or an end of a horizontal edge. List L-act(Y(i)) is first used alone to detect intersection points on ordinate line Y(i); then it is shortened by eliminating the ends of horizontal edges and is compared with a second list, L-pas(Y(i+1)) to detect the intersection points that are located between ordinate lines Y(i) and Y(i+1), not included.

In this example, list L-act(Y(i)) makes it possible to conclude the existence of an intersection point I4 between edge h1 and edge a5, since a5 is located in the list between ends S1 and S2; makes it possible to conclude the existence of an intersection point I5 between edge a7 and edge h1, since, in the list, a7 is between S1 and S2; and makes it possible to conclude the existence of an intersection point I6 between edge a7 and edge h2, since, in the list, a7 is between T1 and T2. Actually, intersection points I5 and I6 are merged, but their division into two follows from the fact that the edges h1 and h2 are considered as independent although they have a common part.

List L-act(Y(i)) also shows the existence of a common segment T1S2, common to edges h1 and h2.

To deduce, from first list L-act(Y(i)), the existence of intersection points located on ordinate line Y(i), the process consists in:

reading list L-act(Y(i)) entirely by updating a third list L-hor(Y(i)) which is blank at the beginning of reading of L-act(Y(i)); a third list in which each horizontal edge is entered when its first end is read in L-act(Y(i)) and in which this horizontal edge is erased when its second end is read in L-act(Y(i)), the first and second end of each horizontal edge being distinguished by the marker;

concluding that there is an intersection each time a nonhorizontal edge or a first horizontal edge end is read in L-act(Y(i)), even if a horizontal edge is present on third list L-hor(Y(i)).

The existence of intersection points between nonhorizontal edges, such as a5 and a6, is detected then, by making a list L-act'(Y(i)) of nonhorizontal edges present in L-act(Y(i)). L-act'(Y(i)) is obtained by eliminating in L-act(Y(i)), ends S1, S2, T1, T2, of horizontal edges h1 and h2:

L-act'(Y(i))=a5, a6, a7, a8.

Then this list is compared with list L-pas(Y(i+1)) of the same edges rearranged according to the increasing abscissas of the passage points of these edges on ordinate line Y(i+1), after these abscissas have been calculated.

L-pas(Y(i+1))=a6, a5, a7, a8.

Comparison of L-act'(Y(i)) and L-pas(Y(i+1)) makes it possible to conclude the existence of an intersection point I7 between a5 and a7.

In practice, the process consists, systematically, for all intervals [Y(i),Y(i+1l)], in determining first the intersection points located on current ordinate line Y(i), then in determining the intersection points located between ordinates Y(i) and Y(i+1), not included. But, further, it is necessary to detect intersection points between horizontal edges on minimal ordinate line Y(i+1) corresponding to the last interval processed in the image considered, so as not to omit possible segments of edges that are on this line.

The essential problem in this determination of intersection points is to be able to perform real time calculations. To save time in making lists, the process consists in deducing list L-act(Y(i) for current interval [Y(i)-,Y(i+1)] from list L-pas(Y(i)), made for the interval processed just before i.e., interval [Y(i−1),Y(i)], by adding to this second list the edges that are taken from a predetermined list L-gen.

L-gen is a list arranged from the set of all the edges of the image, the horizontal edges being represented by their beginning and by their end. All the edges of L-gen are arranged by arranging the nonhorizontal edges according to the decreasing values of the ordinates of their beginnings and, secondarily, according to their slopes, when several nonhorizontal edges have beginnings having the same ordinate; and by arranging the horizontal edges according to their ordinates, and secondarily according to the abscissas of their beginnings when several horizontal edges have the same ordinate.

Figure 5:
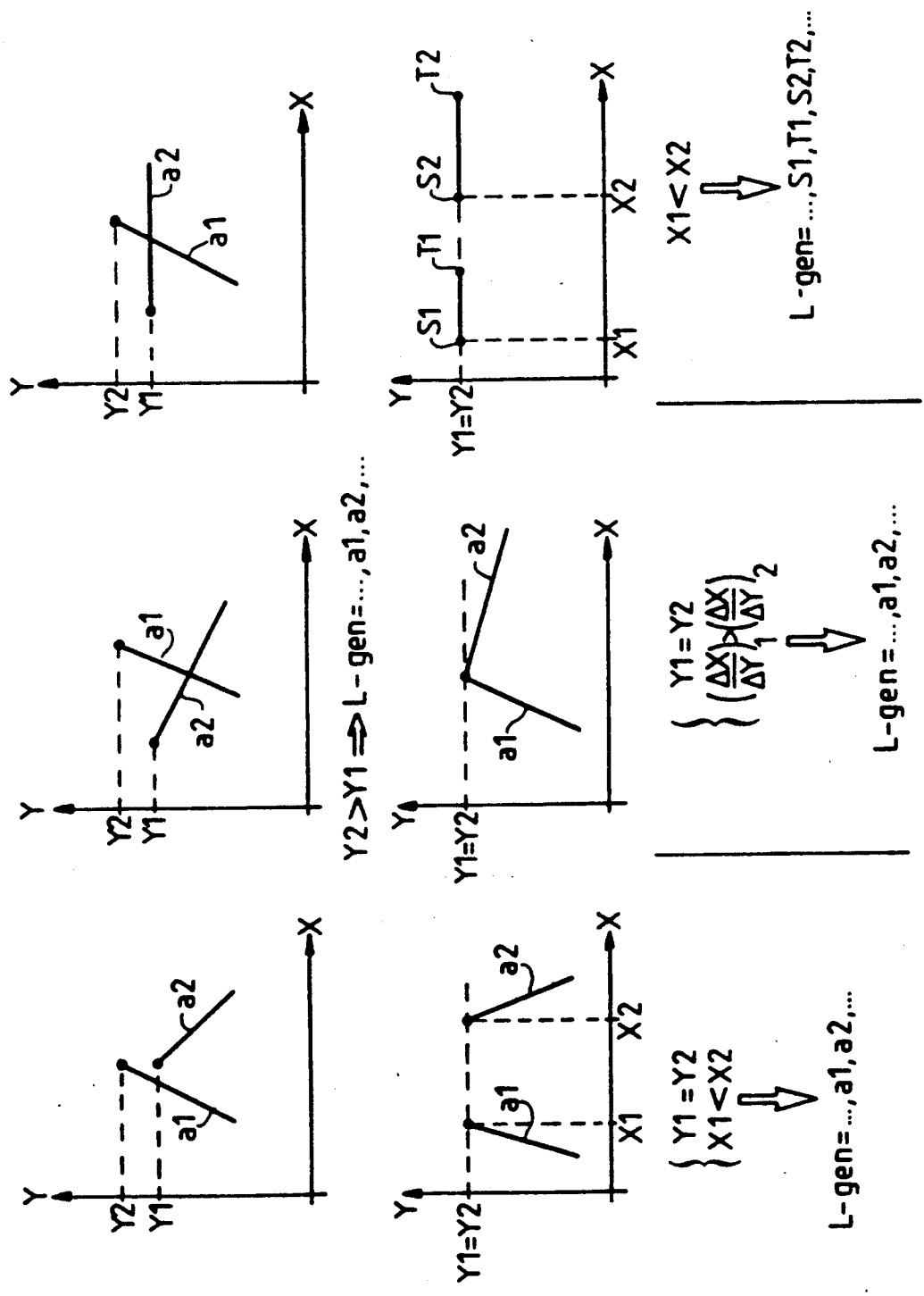
FIG. 5 illustrates a first order relation, making it possible to arrange the set of edges of an image.

FIG. 5 shows examples of the application of this first order relation, especially in particular cases. When two edges have beginnings with the same ordinate, this order relation further takes into account the value of the abscissa of the beginning of each of these edges. They are then arranged in the order of increasing abscissas. When several edges have the same beginning, the order relation further takes into account the slope of each of these edges. This first order relation therefore makes it possible to make, in a unique way, one list of the set of all the edges of the image, L-gen, arranged according to the criteria of this first order relation.

In the example represented in FIG. 2, this list L-gen of the set of all the edges of the image is: a1, a2, a3, a4, a5, a6. The beginnings of these edges are located on horizontal lines having ordinates whose values, ranked by order of decreasing ordinates, are: Y1 . . . Y7.

List L-act(Y(i)) is determined successively for each of intervals [Y(i),Y(i+1)], in the order corresponding to a decrease of ordinates Y(i). It is deduced from list L-pas-(Y(i)) by adding to it the edges which have a beginning whose ordinate is equal to Y(i) and by removing from it the edges which have an end whose ordinate is equal to Y(i). The edges to be added are determined by reading in list L-gen the edges which follow those already having been previously entered in list L-act(Y(i−1); and by comparing the ordinate of the beginning of each edge read in L-gen with the value Y(i). Only edges are suitable whose beginning has an ordinate equal to Y(i).

Figure 6:
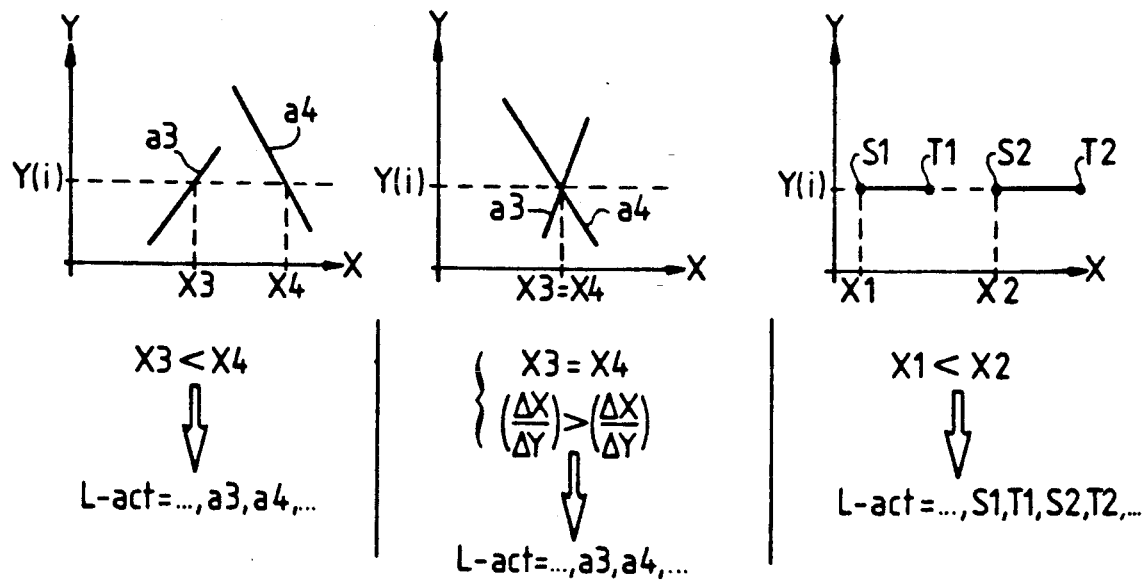
FIG. 6 illustrates a second order relation, making it possible to arrange edges locally, at the level of a given line.

List L-act(Y(i)) is arranged according to a second order relation having as the main criterion the value of the abscissa of the beginning of each edge, as already mentioned above in regard to FIGS. 3 and 4. When two edges have the same abscissa value for their beginning, the second order relation further takes into account the value of the slope. FIG. 6 illustrates three examples of application of a second order relation for determining the list L-act(Y(i)).

By way of example, let us consider the determination of lists L-act(Y(i)) from list L-gen for the image of FIG. 2. When interval [Y1,Y2] is the current interval for determining intersection points, list L-act(Y1) is constituted by looking, in the list L-gen=a1, a2, a3, a5, a6, for the edges having their beginning on ordinate line Y1, then in arranging them according to the second order relation. In this example, no permutation is to be performed since, in L-gen, a1 to a2 were already arranged according to increasing slopes.

L-act(Y1)=a1, a2.

List L-pas(Y1) is determined by calculating the abscissas of passage points of edges a1 and a2 on ordinate line Y2; and by comparing their values, to arrange these edges in the order corresponding to the increasing abscissas. In this example, there is no permutation:

L-pas(Y2)=a1, a2.

List L-act(Y2) is then deduced from list L-pas(Y2) by adding to it the edges read in list L-gen, after edges, a1 and a2, which have already been entered in list L-act(Y1). Only those are added that have their beginning on ordinate line Y2. List L-gen being arranged according to decreasing ordinates, this search can be stopped as soon as an edge does not meet this condition. In this example, edges a4 and a5 meet this condition, and a6 does not meet it.

Further, it is necessary to erase from L-pas(Y2) the edges that have their end on ordinate line Y2, by comparing the ordinate value of the end of each of the edges of L-pas(Y2) with the value Y2. In this example, no edge is to be erased. Finally, it is necessary to arrange, according to the second order relation, the edges which will constitute list L-act. In this example, the abscissas of the passage points of a1 and a2 were calculated just before. It remains to compare them with the abscissa of the beginning of a3 and the beginning of a4, then to compare the edges according to the second order relation:

L-act(Y2)=a1, a3, a4, a2.

List L-pas(Y3) is constituted by calculating the abscissas of the passage points of edges a1, a3, a4, a2 on ordinate line Y3; and by comparing these abscissas to arrange these edges in the order corresponding to the increasing abscissas. In this example, there is no permutation:

L-pas(Y3)=a1, a3, a4, a2.

List L-act(Y3) is then deduced from list L-pas(Y3) by adding to it the edges read in list L-gen, after a1, a2, a3, a4, which have already been entered in this list L-act(Y2). Only those are added that have their beginning on ordinate line Y3. In this example, only edge a5 meets these conditions. Further, it is necessary to erase from L-pas(Y2) the edges that have their end on ordinate line Y3 by comparing the ordinate of the end of each of edges L-pas(Y3) with value Y3. In this example, edge a1 is to be erased from this list. Finally, the edges that will constitute list L-act (Y3) must be arranged according to the second order relation. In this example, this consists in comparing the abscissa of the beginning of the edge to be added, a5, with the abscissas of the passage points of the remaining edges: a3, a4, a2. These abscissas are immediately available since they have just been calculated to make list L-pas(Y2). The edges are then arranged in the order corresponding to the increasing abscissas:

L-act(Y3)=a5, a3, a4, a2.

It should be noted that the ordinates of the edge beginnings no longer intervene at all in the second order relation, which at times leads to having a different order in list L-act and in the list L-gen for identical edges.

The first and second order relation, thus defined, give the set of edges a total order structure that makes it possible to find, in a certain and reproducible way, all the intersection points of edges, while minimizing the necessary calculations, therefore while reducing the calculating time. Application of the criteria defining these two order relations can be made according to various techniques of very standard sorting: bubble, also called surf, sorting; or tree sorting; or merge sorting.

Regardless of the sorting technique used, the period of sorting list L-act(Y(i)) is considerably reduced by the fact that list L-act(Y(i)) can be deduced from list L-pas-(Y(i)), which is constituted just before, and from list L-gen constituted once and for all at the beginning of the processing of an image. Actually, these two lists are arranged close to the order that will be that of L-act(Yi), the sorting then converges very quickly.

It should be noted that the fact of having arranged edges having the same beginning according to their slope makes it possible to avoid detecting a possible permutation of these edges at the time of searching for intersection points. This therefore avoids the useless calculation of the coordinates of an intersection point constituted by the common beginning of these two edges.

During detection of the existence of intersection points of nonhorizontal edges, sorting the abscissas of the passage points of the edges on ordinate line Y(i+1), according to increasing abscissas, can be performed according to various known sorting techniques. For example, this sorting can be performed by permutations. It then consists in considering successively each edge of list L-act(Y(i)) and in comparing, for each edge, the abscissa of its passage point with the abscissa of the passage point of the edge immediately preceding in this list. If the abscissa of the passage point of the preceding edge is greater than the abscissa of the passage point of the edge considered, these two edges should be permuted in the list L-pas and the sorting is continued by comparing the abscissa of the passage point of the edge considered with the abscissa of passage point preceding it in the list L-act.

These comparisons of abscissas are continued by going up the L-act as long as permutations are to be made. When this process has been applied to each edge of list L-act, by going from the last to the first edge, the final list L-pas is obtained. It should be noted that this new list is obtained with, at best, a useless comparison for each edge of list L-act, this comparison corresponding to the case where there is no permutation to be made and which concludes the sequence of comparisons for the edge considered.

Let us consider, for example, sorting by permutations performed to arrange list L-pas(Y(i+1)) in the case of FIG. 3. The list of active edges on line Y(i) is:

L-act(Y(i))=a1, a2, a3, a4.

At the beginning of the calculation for ordinate line Y(i), list L-pas(Y(i+1)) is blank. Sorting by permutation consists first of all in entering edge a1 in this list L-pas. A second step consists in comparing abscissa xp(a2) of the passage point of edge a2 on ordinate line Y(i+1) with the abscissa xp(a1) of the passage point of edge a1 on the same line. In this example, there is no permutation because xp(a1) is less than xp(a2). The comparisons relating to edge a2 are therefore terminated.

L-pas(Y(i+1))=a1, a2.

A third step consists in comparing abscissa xp(a3) of the passage point of edge a3 with abscissa xp(a2) of edge a2. These two edges should be permuted, relative to list L-act(Y(i)), because xp(a3) is less than xp(a2). Before placing edge a3 in list L-pas, it is necessary to compare abscissa xp(a1) of edge a1 with abscissa xp(a3) of edge a3. There is no permutation to be performed because xp(a3) is greater than xp(a1).

The list therefore becomes:

L-pas(Y(i+1))=a1, a3, a2.

Therefore, there appears a permutation from a2 to a3, which corresponds to the existence of an intersection point I1 whose coordinates are easy to determine from the coordinates of the beginnings and ends of edges a2 and a3. This calculation of coordinates can be performed immediately to save time.

A fourth step consists in comparing abscissa xp(a4) of the passage point of edge a4 with abscissa xp(a2) of the passage point of edge a2. A permutation of these two edges should be performed because xp(a4) is less than xp(a2). It is then necessary to compare abscissa xp(a4) of the passage point of edge a4 with abscissa xp(a3) of the passage point of edge a3. A permutation of edges a4 and a3 should be performed because xp(a4) is less than xp(a3). To be able to place a4 in the list, it remains to compare abscissa xp(a4) of the passage point of edge a4 with abscissa xp(a1) of the passage point of edge a1. No permutation is to be performed because xp(a1) is less than xp(a3). The final list therefore is:

L-pas(Y(i+1))=a1, a4, a3, a2.

The two permutations performed during this third step correspond to intersection points I2 and I3. The coordinates of these points can be calculated immediately to save time.

A list of intersection points is constituted by storing in memory, for each intersection point, the coordinates of this intersection point and the identity of the two edges having this point of intersection. From list L-gen of all the edges of the image there is constituted a list of intersection points for each edge, this list then being arranged according to the position of the points of intersection between the first and second end of this edge. For example, this list can be arranged according to decreasing distances relative to the second end of the edge. To simplify the calculations necessary for sorting the intersection points on each edge, the process according to the invention consists in calculating a value proportional to this distance, this value further being used for calculating the coordinates of the intersection point, which therefore prevents additional calculations for arranging the intersection points.

Figure 7:
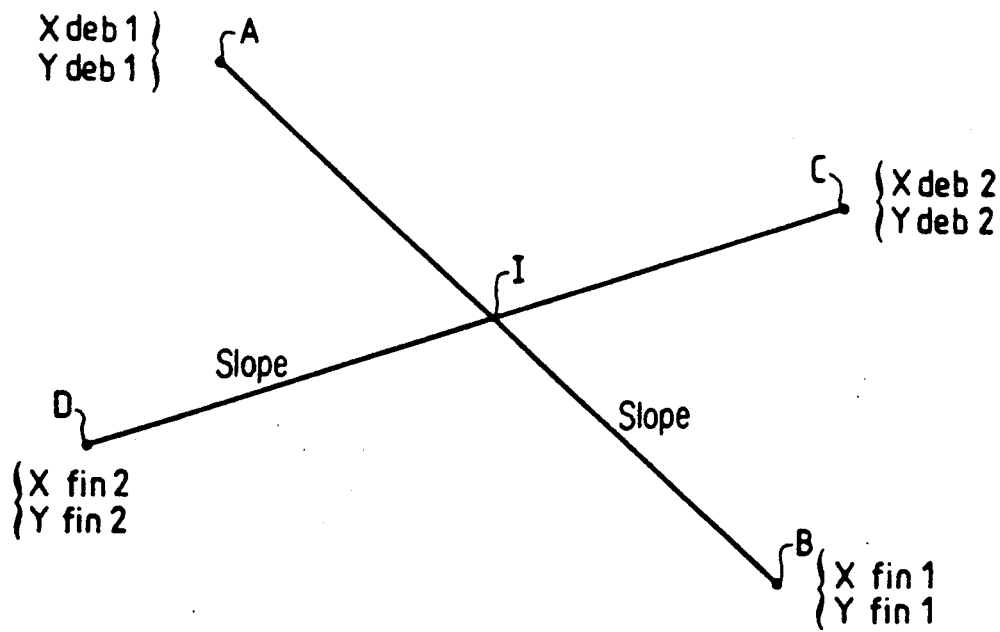
FIG. 7 illustrates the calculation of the coordinates of the intersection point of two edges, and the sorting of the intersection points on the same edge, according to a third order relation.

Let us consider the example represented in FIG. 7, and show that an intermediate value T(I), intervening in calculation of the coordinates of intersection point I, makes it possible to know the position of point I relative to one end of one of the edges having common intersection point I. In this example, point I is the intersection point of an edge AB and an edge CD. Point A has as coordinates (Xdeb1, Ydeb1) and constitutes the beginning of edge AB. Point B has as coordinates (Xfin1, Yfin1) and constitutes the end of edge AB. Point C has as coordinates (Xdeb2, Ydeb2) and constitutes the beginning of edge CD. Point D has as coordinates (Xfin2, Yfin2) and constitutes the end of edge CD.

Each point of edge AB satisfies the following equation system:

$$X = Xfin1 + t(I) \cdot (Xdeb1 - Xfin1) \quad (1)$$

$$Y = Yfin1 + t(I) \cdot (Ydeb1 - Yfin1)$$

with $t(I) = IB/AB$ which is between 0 and 1. Also, each point of edge CD satisfies a similar system of equations comprising another parameter value: $t'(I)$:

$$X = Xfin2 + t'(I) \cdot (Xdeb2 - Xfin2)$$

$$Y = Yfin2 + t'(I) \cdot (Ydeb2 - Yfin2) \quad (2)$$

The coordinates of intersection point I should satisfy the system of equations:

$$t(I) \cdot (Xdeb1 - Xfin1) - t'(I) \cdot (Xdeb2 - Xfin2) = (Xfin2 - Xfin1)$$

$$t(I) \cdot (Ydeb1 - Yfin1) - t'(I) \cdot (Ydeb2 - Yfin2) = (Yfin2 - Yfin1) \quad (3)$$

It is shown that the coordinates of the intersection point obtained by solving this system of equations are:

$$X(I) = Xfin1 + T(I) \cdot slope$$

$$Y(I) = Yfin1 + T(I) \quad (4)$$

where the parameter T(I) is equal to:

$$T(I) = t(I) \cdot (Ydeb1 - Yfin1) = \frac{IB}{AB} \cdot (Ydeb1 - Yfin1) \quad (5)$$

and can be calculated according to the formula:

$$T(I) = \frac{(Yfin2 - Yfin1) \cdot Pente2 - (Xfin2 - Xfin1)}{Slope2 - Slope1} \quad (6)$$

with $$Slope1 = \frac{Xdeb1 - Xfin1}{Ydeb1 - Yfin1} ;$$

$$Slope2 = \frac{Xdeb2 - Xfin2}{Ydeb2 - Yfin1}$$

Calculation of T(I) according to formula (6) makes it possible not only to calculate the coordinates of intersection point I, by replacing T(I) by its value in the system of equation (4), but also makes it possible to arrange the list of intersection points when one edge comprises several intersection points respectively with several other edges. Actually, for one of edges, AB, for example, formula (5) shows that parameter T(I) is proportional to distance IB, since length AB is a constant and that the difference between Ydeb1 and Yfin1 is also a constant.

Each time an intersection point is detected, the edge, which is the least priority of the two edges that define this intersection point, is selected then value T(I) is calculated to determine the coordinates of this intersection point and to enter this point in the list of intersection points existing on the edge considered, this list being arranged according to decreasing values of T(I).

The determination of an indicator for each intersection point therefore is also advantageously performed as the detection of the existence of intersection points proceeds. Therefore, it consists, first, in determining which is the least priority of the two edges having the point of intersection considered. The least priority edge is the one that will be partially masked by the facet to which the most priority edge belongs. In this example, the priority is defined by a parameter value which is constant for all edges of a facet. Therefore the least priority edge is determined by comparing the value of the priority parameter of its facet with the value of the priority parameter of the facet of the other edge.

The indicator determined for the intersection point considered will be attached to the least priority edge because it will be masked, the intersection having no effect on the visibility of the most priority edge. This indicator indicates whether the least priority edge is masked from the intersection point considered or before the intersection point considered, the least priority edge being scanned from its beginning to its end. In the first case, the indicator has a marked value DA, conveying the beginning of activity of the masking facet, and in the second case a value FA conveying the end of activity of the masking facet. There is a third case, where an edge is common to two facets. If this edge intersects another edge, which is least priority relative to these facets, the intersection point marks the end of activity of one facet and marks the beginning of activity of another facet, and the edge therefore is masked before and after the intersection point.

The value of an indicator IND(I) for each intersection point I is determined as a function of:

the order of the two edges having the intersection, in the first list L-act(Y(i)) corresponding to the interval [Y(i),Y(i+1)] where the intersection point considered is found;

the position of the most priority facet relative to the edge which is part of this facet and which has the intersection point considered.

Determination of the value of the indicator therefore requires the introduction of the notion of top edge, bottom edge, right edge and left edge of a facet, and then requires distinguishing nine cases.

Figure 8:
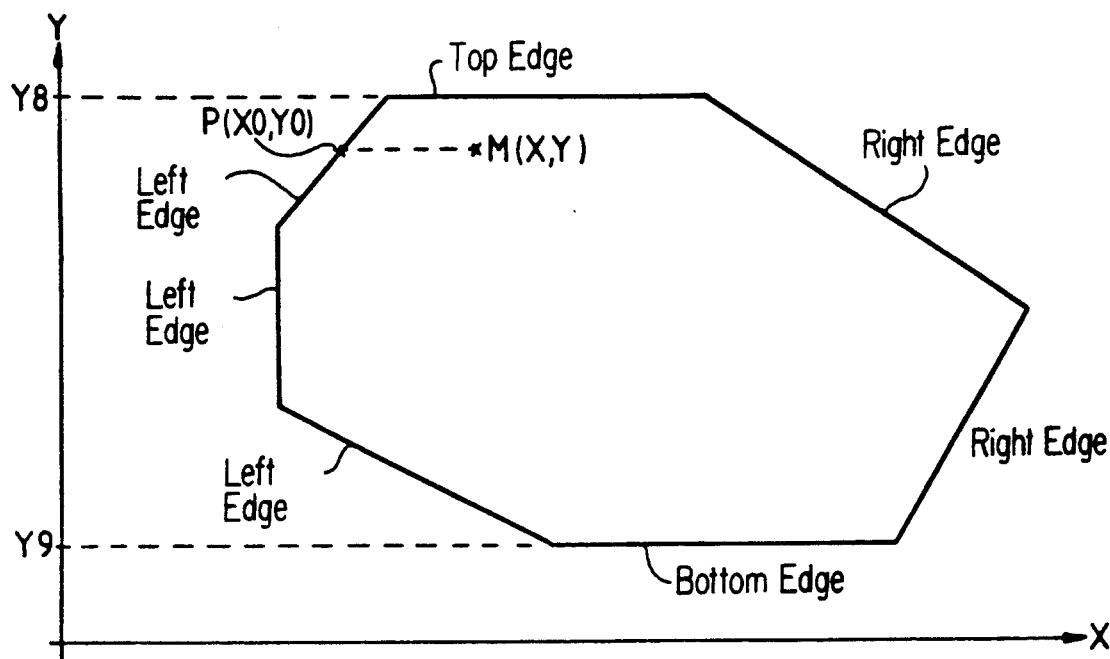
FIGS. 8 to 17 illustrate the determination of the value of an indicator for each intersection point.
Figure 9:
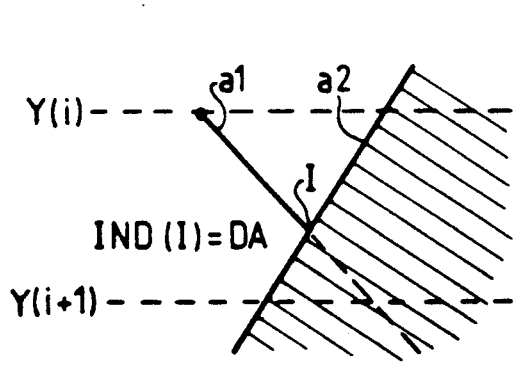

FIG. 8 represents a facet and illustrates the definition of these four types of edges. A horizontal edge of ordinate Y8 is called the top edge of the facet considered, if any point M(X,Y) belonging to this facet has an ordinate Y strictly less than Y8. A horizontal edge of ordinate Y9 is called bottom edge, if any point M(X,Y) belonging to the facet has an ordinate Y strictly greater than Y9.

A nonhorizontal edge is called left edge for a given facet, if, for any point p(XO,YO) of this edge, there is at least one point M(X,Y) belonging to the facet and such that Y is equal to YO and such that X is strictly greater an XO.

A nonhorizontal edge is called right edge for a given facet, if, for any point Q(X1,Y1) of the edge there is at least one point M(X,Y) belonging to the facet such that Y is equal to Y1 and such that X is strictly greater than X1.

As was mentioned above, an edge can be common to two facets. It can therefore simultaneously be a right edge for a first facet and a left edge for a second facet. Also, an edge can simultaneously be a top edge and a bottom edge.

FIGS. 8 to 17 illustrate the nine cases to be distinguisbed for determining indicator IND(I). Each time, the most priority edge is marked a2 and the least priority edge is marked a1. In the first case, represented on FIG. 9, the priority edge constitutes the left edge of the facet to which it belongs, on the other hand it is located after the least priority edge, a1, in the list L-act(Y(i)). In this case, the facet masks edge a1 after intersection point I. Point I is a beginning point of masking activity for the facet. Value DA is ascribed to indicator IND(I).

Figure 10:
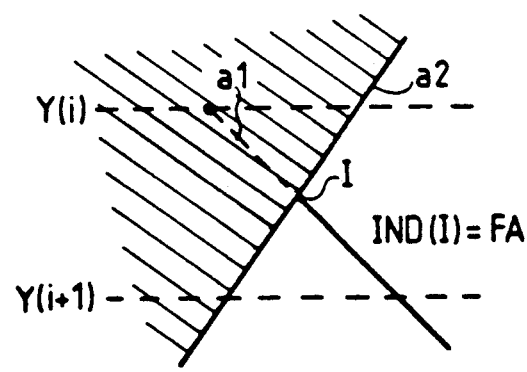

In the case represented in FIG. 10, the most priority edge, a2, constitutes a right edge of the most priority facet; on the other hand, it is located after the least priority edge, a1, in list L-act(Y(i)). In this case, the facet masks edge a1 before point I. Point I is an end point of masking activity for the facet. Value FA is ascribed to indicator IND(I).

Figure 11:
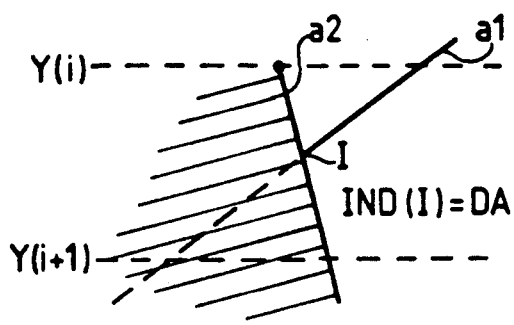

In the case represented in FIG. 11, the most priority edge, a2, constitutes a right edge of the most priority facet; on the other hand, it is located ahead of edge a1 in list L-act(Y(i)). In this case, the facet masks edge a1 after intersection point I, consequently value DA is ascribed to indicator IND(I).

Figure 12:
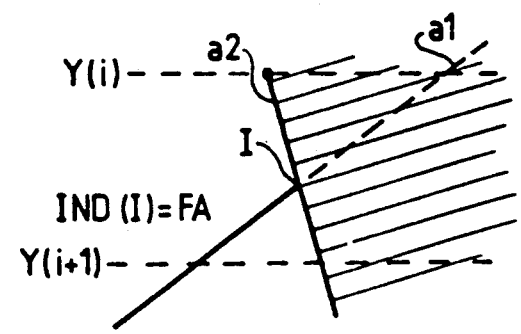

In the case represented in FIG. 12, the most priority edge, a2, constitutes the left edge of the most priority facet; on the other hand, it is located before edge a1 in list L-act(Y(i)). The facet masks edge a1 ahead of point I, consequently value FA is ascribed to indicator IND(I).

Figure 13:
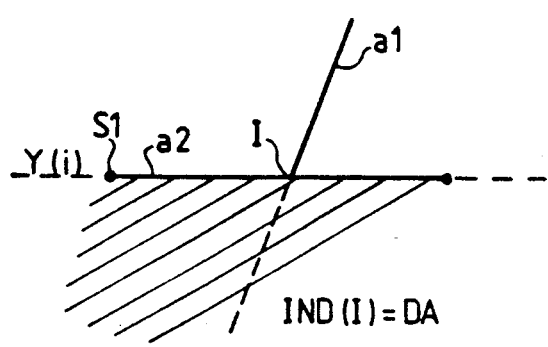

In the case represented in FIG. 13, the most priority edge, a2, is a horizontal edge located at ordinate Y(i) and it constitutes the top edge of the most priority facet. Beginning S1 of edge a2 is located ahead of edge a1 in list L-act(Y(i)), which corresponds to the fact that the facet begins to mask edge a1 from intersection point I. Consequently, value DA is ascribed to indicator IND(I).

Figure 14:
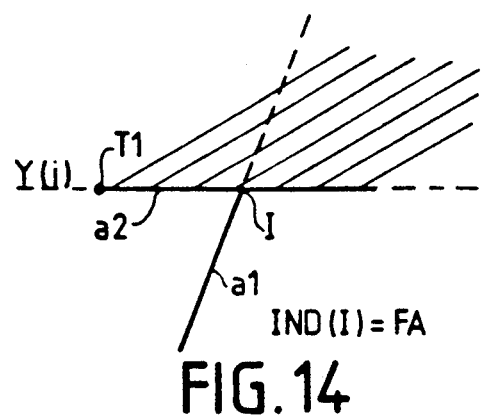

In the case represented in FIG. 14, the most priority edge, a2, is a horizontal edge of ordinate Y(i) constituting the bottom edge of the most priority facet. Beginning T1 of this edge is located ahead of edge a1 in list L-act(Y(i)), which corresponds to the fact the facet masks edge a1 to point I. Consequently, value FA is ascribed to indicator IND(I).

Figure 15:
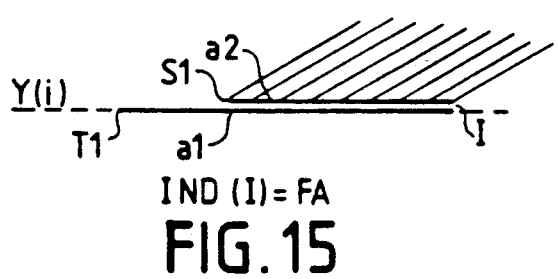
Figure 16:
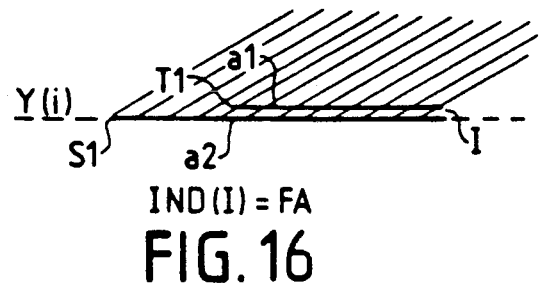

In the case represented in FIG. 15, most priority edge, a2, is a horizontal edge, just like edge a1, on ordinate line Y(i). Beginning S1 of edge a2 is placed after beginning T1 of edge a1 in list L-act(Y(i)). Edges a1 and a2 have the same end, I, which is considered as the intersection point of these two edges. In such a case, just as in the case where a2 is a top edge, point I is considered as the activity end point of the most priority facet.

In the case represented in FIG. 10, edges a1 and a2 are two horizontal edge of ordinate Y(i), but beginning S1 of most priority edge, a2, is located ahead of beginning T1 of the other edge, a1, in list L-act(Y(i)). In this example, edge a2 constitutes the bottom edge of the most priority facet. Edges a1 and a2 have a common end 1, which is considered as the intersection point of these two edges. In this case, just as in the case where edge a2 constitutes the top edge of the most priority facet, point I constitutes the activity end point, consequently value FA is ascribed to indicator IND(I).

Figure 17:
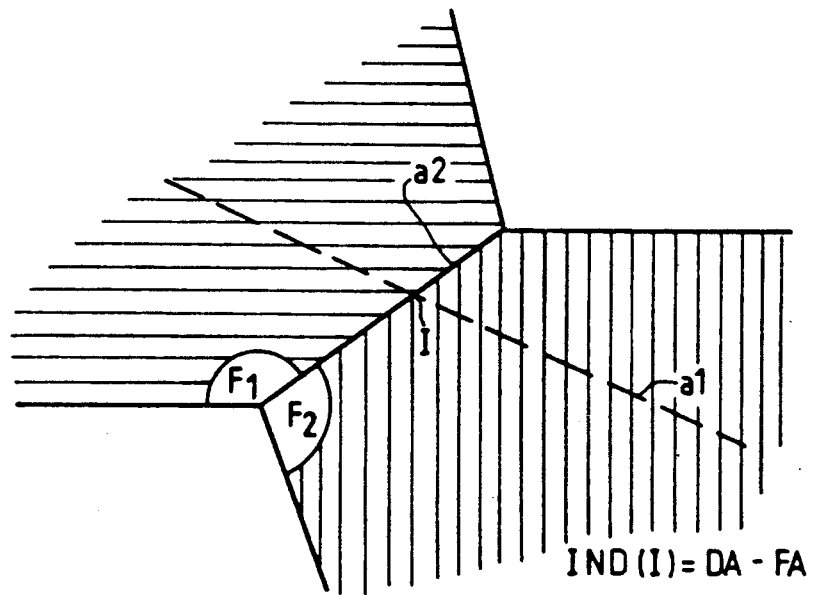

In the case represented in FIG. 17, two facets F1 and F2 have a common edge a2 which intersects, at point I, an edge a1 belonging to a third facet, less priority than F1 and F2. A third value, marked DA-FA, is ascribed to indicator IND(I). It conveys the fact that the masking activity of F2 begins as soon as the masking activity of F1 ends, which causes a masking before and after point I.

The determination of number n of facets that mask the beginning of each edge is successively performed for each interval [Y(i),Y(i+1)], taken in the order of decreasing ordinates. To save time, it can be performed parallel with the determination of the intersection points. It consists in reading entirely list L-act(Y(i)) of the active edges in the interval considered, distinguishing, on the one hand, the edges whose beginning is located on the current line, of ordinate Y(i), and, on the other hand, the other edges of L-act(Y(i)). These other edges belong to facets that are able to mask the edge beginnings located on the current line. Two means are used to characterize the masking activity of these facets, on these edge beginnings:

a list L-fac(Y(i)), indicating the facets able to mask an edge beginning, is updated as a horizontal scanning proceeds consisting in successively reading the edges of L-act(Y(i));

an indicator, actif(F), belonging to each active facet F on the current line, makes it possible to distinguish the particular case where the facet is actually tangent, by its bottom edge, to the current line, and therefore can mask only the very beginning of an edge;

actif(F) = 1, if the facet is able to mask the current line clearly, before the edge considered, which has just been read in list L-act(Y(i));

actii(F)=0, if it is not able to mask the current line, before the edge considered;

actif(F)=2, if it is able to mask the current line tangentially, i.e., if facet F has a bottom edge located on the current line and if this facet has previously been encountered during reading L-act(Y(i)).

The indicator makes it possible to make list L-fac(Y(i)), since the latter makes it possible to determine number n, by counting the number of facets that are in list L-fac(Y(i)) in its state corresponding to the beginning edge considered, i.e., at the instant when this beginning edge is read in list L-act(Y(i)). Only the facets having a priority greater than that of the beginning edge considered is taken into account in n.

Figure 18:
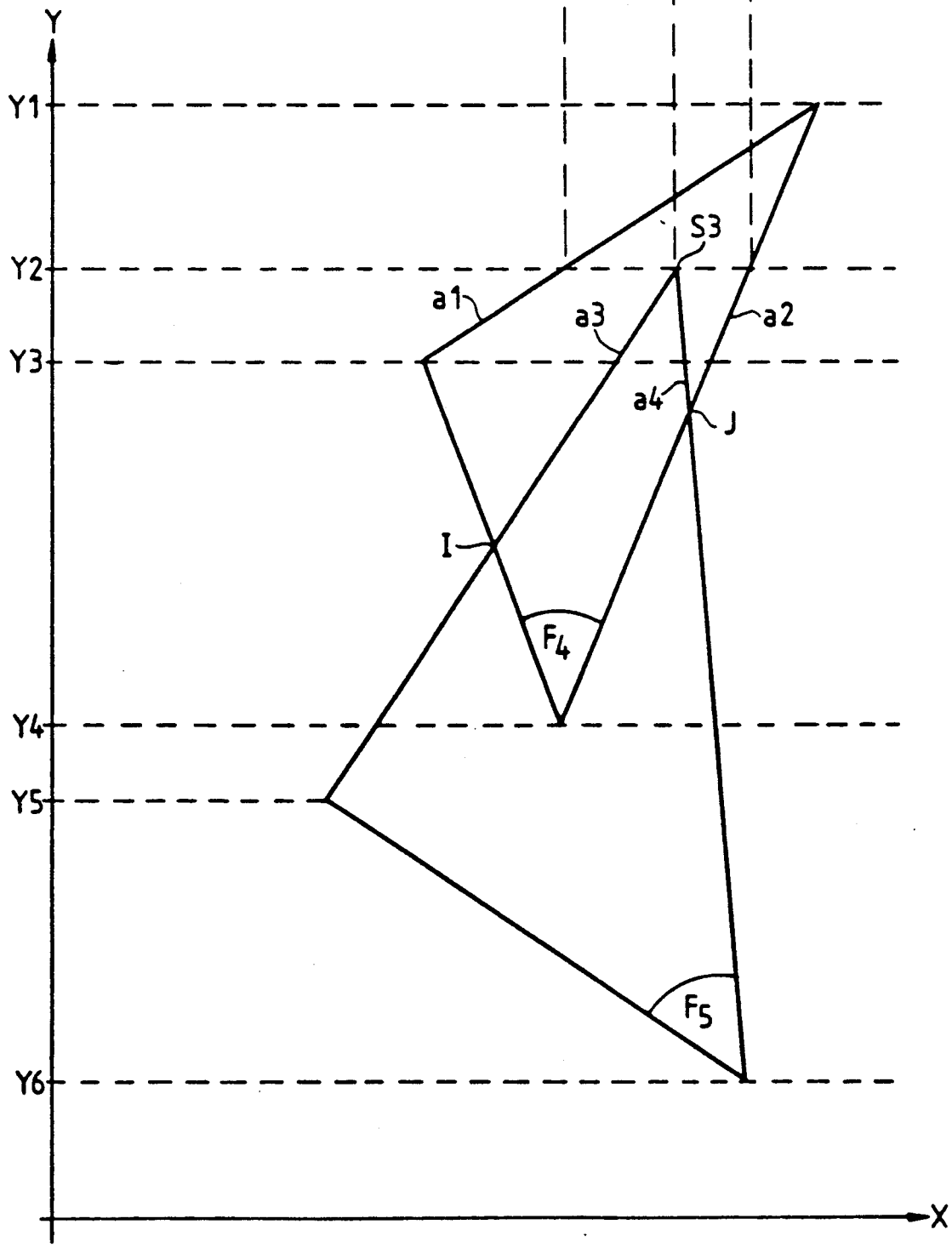
FIGS. 18 to 21 illustrate the determination of the number of facets that mask the first end of each edge of an image.

FIG. 18 illustrates, in a very simple example, the principle of determining the number of facets that mask the beginning of an edge. When the current line is ordinate line Y(1), the list of active facets L-fac(Y(1)) is blank because the current line does not then intersect any edge, list L-act(Y1) comprising only beginning edges: a1 and a2.

When the current line is ordinate line Y2, determination of L-act(Y2)=a1, a3, a4, a2, makes it possible to know that a3 and a4 are beginning edges, while a1 and a2 cross only ordinate line Y2. The edges of list L-act(Y(2)) are successively considered to update list L-fac(Y2), to determine indicator actif(F) for each facet F encountered, and to count the number n of facets masking each edge beginning. The list of active facets L-fac(Y2) is initially blank, then comprises facet F4 from reading a1 in L-act(Y(2)) because edge a1, belonging to facet F4, has a passage point on the current line. Then facet F4 is erased from list L-fac(Y(2)) after reading a2 in L-act(Y(2)) because a2 is a second edge belonging to facet F4. This temporary entry of facet F4 in L-fac(Y2) corresponds to the fact that facet F4 is able to mask edges in the zone of abscissa that is located between the passage point of edge a1 and the passage point of edge a2 on the current line, of ordinate Y2.

Meantime, edges a3 and a4 have been read in L-act(Y(2)) but without modifying L-fac(Y(2)) because a3 and a4 are beginning edges. At the moment when a3 and a4 are read in L-act(Y(2)), the list of active facets L-fac(Y2) contains facet F4, which makes it possible to conclude that beginning S3 of facets a3 and a4 is able to be masked by facet F4. It then remains to compare the priority of facet F5 to which a3 and a4 belong with the priority of facet F4 to deduce whether facet F4 should actually be counted in number n of the facets masking beginning S3 of edges a3 and a4.

In this very simple example, it appears evident that the possible masking activity of facet F4 begins when the reading of L-act(Y(2)) indicates the existence of a passage point of edge a1 on the current line, and that this activity ends when the reading of L-act(Y(2) indicates the existence of a passage point of edge a2 on the current line, knowing that facet F4 comprises particularly edges a1 and a2. In practice, there are more complicated cases, particularly because of horizontal edges.

In the general case where in particular there are horizontal edges on the current line, the determination of number n of facets that mask the first end of each edge, beginning on ordinate line Y(i), consists in:

successively reading the edges and ends of edges contained in list L-act(Y(i));

updating list L-fac(Y(i)), containing the facets able to mask an edge of list L-act(Y(i)), list L-fac(Y(i)) being blank at the beginning of reading of L-act(Y(i)), a facet F being entered in L-fac(Y(i)) when a first nonhorizontal edge a1 belonging to this facet F is read in list L-act(Y(i)) or else when a first end of a horizontal edge belonging to this facet F is read in list L-act(Y(i)); and this same facet F then being removed from L-fac(Y(i)) when a second nonhorizontal edge belonging to this facet F is read in L-act(Y(i)), or else when the second end of a horizontal edge belonging to this facet F is read in L-act(Y(i));

compare the priority of each edge having its first end on the current line with the priority of each facet F contained in L-fac(Y(i)) in the state corresponding to the edge considered, then in counting the number of facets present in L-fac(Y(i)) and having a priority greater than that of the edge considered. This number constitutes number n of facets that mask the first end of the edge considered.

List L-fac(Y(i)) is established from list L-act(Y(i)) by determining the position of at least one facet for each of the edges of L-act(Y(i)), taken successively, except for the edges beginning on ordinate line Y(i). Actually, each of these edges belong to the contour of at least one facet, but this facet can be located on either side of this edge. Some edges being common to two facets, it is then necessary to determine the position of the two facets.

This position is conveyed by indicator, actif(F). This indicator corresponds to the position of facet F relative to the edge considered at a given instant. Its value varies as the reading of the edges of the list of active edges on the current line progresses. The value of the indicator and list L-fac which flows from it are determined according to the following algorithm.

For each edge a, not beginning on the current line, the reading of the list of facets having this edge indicates at least one edge: F.

Figure 20:
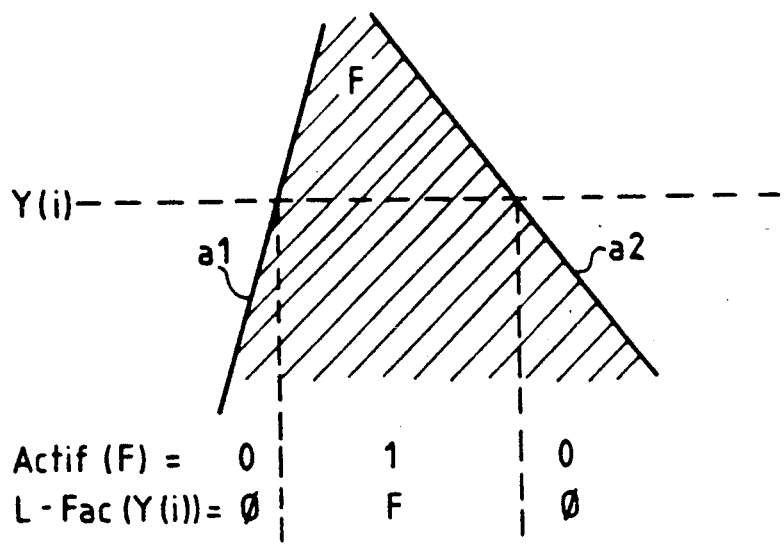

If facet F is already active, i.e., if the value of indicator actif(F) is already equal to 1, for example because an edge a1 of the facet has been previously found in the list of active edges on the current line, two cases are to be distinguished:

if a is a horizontal edge, represented by its beginning S1 or by its end S2, then edge a is a top edge. The value of the indicator is kept at 1 and facet F is kept in the list of active facets. This case is that of edge a3 represented in FIG. 19.

if edge a is not horizontal, then it is a right edge. Facet F is no longer active, it is necessary to give the value 0 to the indicator and to remove F from the list of active facets. This is the case of edge a2 on the right part of FIG. 19 and on the right part of FIG. 20.

Figure 19:
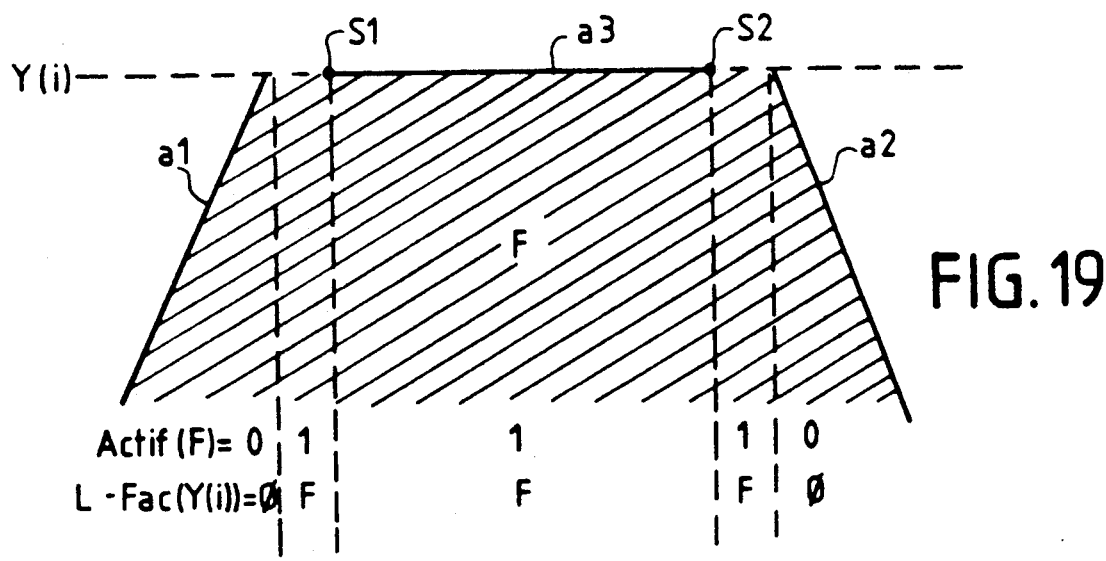
Figure 21:
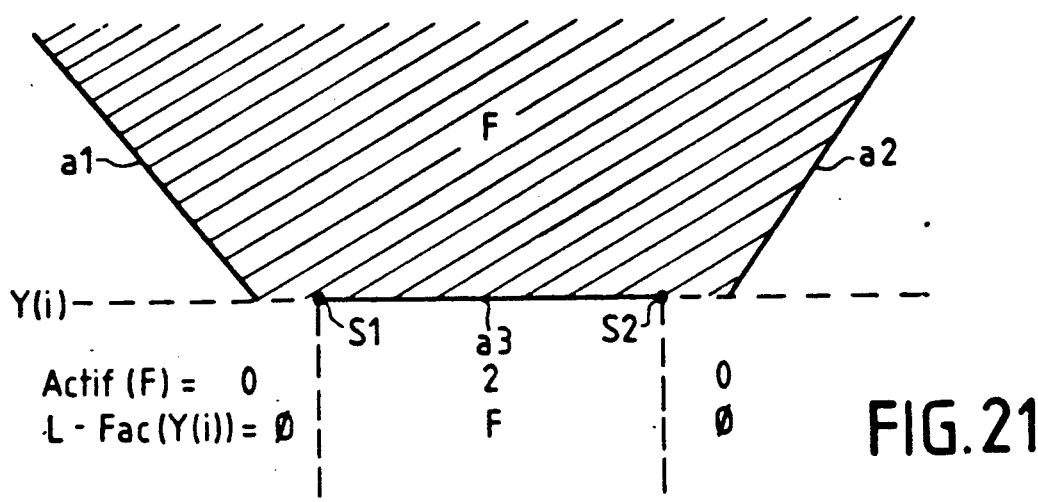

If facet F is not already active, i.e., if the value of its indicator is equal to 0, two cases are to be distinguished:

if edge a is not horizontal, it is necessarily of the left edge type. Facet F becomes active. It is necessary to give value 1 to the indicator and enter F in the list of active facets. This is the case of edge a1 in FIGS. 19 and 20. In FIG. 19, a space has been represented between the beginning of edge a1 and the beginning of S1 of horizontal edge a3, because the list of active edges mentions separately edge a1, then beginning S1, and because they each correspond to two successive stages of the determination of the indicator and the list of active facets. Of course, this discontinuity does not exist in the reality of the plotting of the edges.

if edge a is horizontal, it is necessary to distinguish two cases according to which the facet is not active, with an indicator equal to 0, or else is active with an indicator equal to 2, which occurs when a bottom edge has been encountered.

actif(F)=0, F is not active, edge a is necessarily the beginning of a horizontal edge of the bottom edge type. It is necessary to give the value 2 to the indicator to indicate that there is an active facet F and to indicate that it is in a particular situation, since only its bottom edge is able to mask another edge. Facet F should also be entered in the list of active facets on the current line. This is the case of edge a3 in the example represented in FIG. 21, in its left part. As in FIG. 19, a space has been represented in FIG. 21 between the end of edge a1 and beginning S1 of edge a3, and a space has been represented between end S2 of edge a3 and the end of edge a2 constituting the right edge of facet F, but this space does not exist on the actual plotting of the facets.

if actif(F)=2, facet F is active, but in the particular case of a bottom edge. Edge a is actually end S2 of a horizontal edge. This is the case of edge a3 in the example of FIG. 21. Facet F becomes inactive beyond point S2; therefore the value 0 should be given to the indicator and F should be removed from the list of active facets.

The process according to the invention can be used, in real time, by a general purpose microprocessor, for example of the 68020 type marketed by Motorola, connected to a program memory and a floating point coprocessor. Writing of the builder program is within the scope of one skilled in the art from the description of the process according to the invention.

Figure 22:
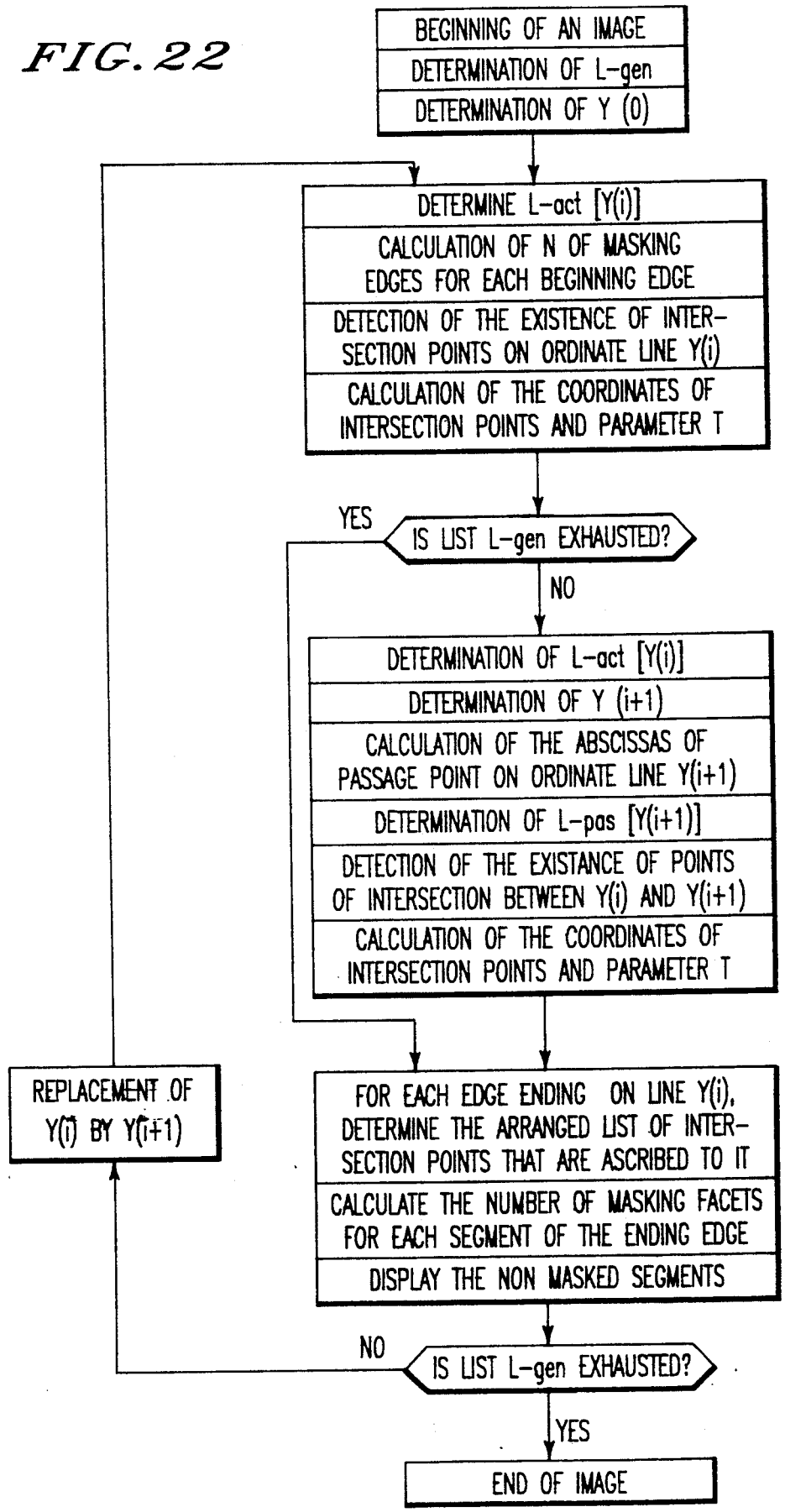
FIG. 22 represents an algorithm showing the sequence of operations performed on an image.

FIG. 22 represents the flow chart of a program for using the process according to the invention by a general purpose microprocessor. This flow chart summarizes the numerous operations described above, showing their chaining to process an image. The edges of the image have previously been determined by a process and device of known type. Each edge is represented by the coordinates of these two ends and by its slope. The program orders making of list L-gen of all these edges, arranged according to the first order relation, by a known sorting technique, for example bubble sorting.

The program then orders the determination of Y(O) which is constituted by the ordinate of the beginning of the first edge entered in list L-gen. The program then orders making of list L-act(Y(i)). In the general case, making L-act(Y(i)) consists in adding to list L-pas(Y(i-I)) the edges taken from list L-gen, which have not previously been entered in list L-act and whose beginning has Y(i) as ordinate, and in removing from list L-pas(Y(i)) the edges of this list whose end bas Y(i) as ordinate.

In the particular case of i=0, making this list is simpler then in the general case but the sequence of operations is the same.

The program then orders calculation of number n of masking facets for each of the edges beginning on ordinate line Y(i), i.e., the edges added to the list. It also orders the detection of the existence of intersection points located on line Y(i). Then it orders calculation of parameter T, then calculation of coordinates of each intersection point which has been detected.

Then it orders the determination of list L-act'(Y(i)) provided that list L-gen is not exhausted. List L-act'(Y(i)) comprises the edges of list L-act(Y(i)), less the horizontal edges. Then it orders the determination of Y(i+1) by looking for the greatest ordinate value of the values of ordinates of the ends of the edges entered in L-act'(Y(i)), and the ordinate value of the beginning of the first edge available in L-gen. Then it orders the determination of the coordinates of the passage points of the edges of L-act'(Y(i)), on ordinate line Y(i+1). Then it orders making of list L-pas(Y(i+1)), arranged as a function of the abscissas of the passage points previously determined. Then it orders the detection of the existence of intersection points having an ordinate between Y(i) and Y(i+1). Then it orders calculation of parameter T and the coordinates of these intersection points.

Then the program orders, for each edge ending on ordinate line Y(i+1), the determination of an arranged list of the intersection points ascribed to this edge. The order is that of decreasing values T, this value being calculated for each intersection point according to formula (6), each intersection point being ascribed to the least priority edge of the two edge having this point of intersection. This operation is also performed when it has been detected that list L-gen is exhausted, i.e., after the determination of the intersection points on the lowest horizontal edges of the image.

Then the program orders the calculation of number n of the masking facets for each segment of the edge considered. Finally, the program orders the display of the nonmasked segments, by providing the coordinates of their ends to the display device. If list L-gen is not exhausted, the program orders Y(i) to be replaced by Y(i+1), then again orders the preceding operations, starting from the determination of list L-act(Y(i)). When list L-gen is exhausted, processing of the current image is completed.

The invention is not limited to the examples of use described above. Numerous variants are possible, particularly in the organization of the calculations.

A variant of the determination of the segments that are visible and those that are hidden can consist in scanning the entire contour of a facet from the first end of one of the edges, by successively chaining all the edges of the contour, by determining number n of facets masking the first end, only for the first end of the first edge. The calculations are then somewhat simplified since the number of masking facets is not determined for the first end of the other edges of the contour. In this case, it is necessary to have, for each facet, an arranged list of edges constituting the contour of this facet. On the other hand, this variant has the drawback that an error in determining the visible segments of one edge can have an effect on the other edges constituting the contour.

Chaining of the calculations to determine all the visible segments of the contour of the same facet also has the advantage of making possible chaining of the illumination of these segments. This makes it possible to save time by avoiding idle times to deflect the electron beam of the cathode tube to scan the edges that are distant because they do not belong to the same contours.

It is also possible to use the process according to the invention by another type of equipment, more specialized: integrated circuits specialized for solving linear equations, and integrated circuits specialized for fast sortings.

To simplify the calculations due to processing horizontal edges, a variant of the process consists in slightly shifting the critical points of the image to eliminate the horizontal edges. This shift should obviously take into account the definition of the display screen and the precision desired for the displayed image.

Another variant of the process consists in defining a masking activity outside certain facets, in addition to the inside masking activity described above. It consists in masking the edges located on the outside of the facet considered, this facet constituting a window. An additional parameter, distinguishing the inside and outside activity, then makes it possible to achieve a windowing, i.e., makes it possible to eliminate edges located outside a certain yield. This, for example, makes it possible to draw holes in a facet of an object.

The process is applicable particularly to the synthesis of a three-dimensional symbol on a display of an aircraft instrument panel.

We claim:

1. A process for eliminating hidden faces for synthesis of a three-dimensional wire image wherein said wire image consists of facets, each facet consisting of edges each represented by the coordinates of its ends and by the value of its slope, in a Cartesian system of coordinates of two axes of coordinates, each point of an edge being provided with a priority parameter making it possible to restore the appearance of a third dimension, on a two-dimension display, said process comprising the steps of:

extracting data from a data base to determine the facets which will represent an object in wire form;

performing a geometric transformation on each of said facets to place it in a Cartesian system of coordinates which is the coordinates of the observer of the synthesis image and no longer the coordinates corresponding to the calculations made in order to provide the data base;

performing a cutting to eliminate the facets which will be outside the observer's field of vision wherein said field of vision has the shape of a pyramid whose vertex is the observers eye;

providing a projection of said facets on a display plane by a homothetic transformation whose ratio is a function of the distance between the observer and the point to be projected on the screen and also a function of the distance between the observer and the screen;

determining intersection points of all edges by:

cutting a set of ordinate values into intervals so that each bound is the ordinate value of an edge end and so that no ordinate of an edge end is in said intervals;

determining, for each interval, the coordinates of intersection points of edges whose ordinates are in said intervals;

constituting, for each edge, a list of the intersection points of said each edge with other of said edges of higher priority wherein said list is arranged according to the position of points of intersection between a first and second edge end;

determining, for each intersection point the value of an indicator indicating if the facet of the higher priority edge masks the least priority edge, from the intersection point considered; or masks it before the intersection point considered; or else masks it before and after the intersection point; each edge being scanned from a first to a second end;

determining, for a first end of each image, a number of facts which mask said first end;

determining, for each edge, the segments of said each edge which are visible and those that are hidden, by determining a number of facets that mask each segment, based on said number of facets which mask said first end of the edge, and based on the values of the indicators for said points of intersection of said each edge with most priority edges whereby the hidden parts of said facets are able to be eliminated; and displaying on a display device the image obtained by calculating the actuating signals corresponding to each edge segment that is to be lit up on the screen.

2. A process according to claim 1, wherein determining, for each interval, the coordinates of the intersection points comprises the steps of:

determining a first list, consisting of edges, called nonhorizontal, having a single point, called a passage point, on a first ordinate line, and consisting of the first and second ends of edges, called horizontal, whose points are all located on the first ordinate line, this list being arranged as a function of the abscissas of the passage points of nonhorizontal edges, and secondarily as a function of their slope, and being arranged as a function of the ends of the horizontal edges;

deducing from this first list the existence of intersection points located on said first ordinate line;

determining the abscissas of the passage points of the nonhorizontal edges of the first list on a second ordinate line;

determining a second list consisting of all the nonhorizontal edges of the first list, and arranged as a function of the abscissas of their passage points on said second ordinate line;

comparing the order of said first list and that of said second list (L-pas(Y(i+1))), and deducing from this the existence of intersection points located between said first and second ordinate lines;

calculating the coordinates of an intersection point for each pair of edges for which an intersection has been detected.

3. A process according to claim 2, wherein deducing from said first list the existence of points of intersection between nonhorizontal edges and horizontal edges comprises the steps of:

reading said first list entirely by updating a third list which is blank at the beginning of the reading of the first list, and in which each horizontal edge is entered when a first end of this edge is read in the first list, and in which this horizontal edge is erased when a second end is read in the first list;

concluding that there is an intersection, each time that a nonhorizontal edge is read in said first list when a horizontal edge is present on the third list.

4. A process according to claim 2, wherein determining said first list of edges, for each interval comprises the steps of:

making a list of all the edges of the image, by arranging the nonhorizontal edges according to decreasing values of the ordinates of their first ends, the first end being defined as the one having the greatest ordinate, and secondarily according to their slope, when several nonhorizontal edges have first ends having the same ordinate, and by arranging the horizontal edges according to their ordinates, and secondarily according to the abscissas of their first ends, when several horizontal edges have the same ordinate;

determining said first list successively for each interval by considering the intervals in the order of decreasing first ordinates, starting from said second list determined for the interval considered just before said each interval by adding to this second list the edges which have a first ordinate end equal to said first ordinate line, and removing from it the horizontal edges and edges that have a second end having an ordinate equal to said first ordinate line.

5. A process according to claim 2, wherein the value of said indicator for each intersection point is determined as a function of:

the order of two edges having an intersection in said first list corresponding to the interval where the intersection point considered is found;

and the position of the most priority facet relative to an edge which is part of this facet and which has the intersection point considered.

6. A process according to claim 2, wherein determining the number of facets that mask the first end of each edge, successively in each interval, taken in the order of decreasing ordinates, comprises the steps of:

successively reading the edges and the ends of edges contained in said first list constituted for the current line corresponding to this interval;

updating a fourth list containing the facets able to mask an edge of the first list, the fourth list being blank at the beginning of reading of the first list, a facet being entered in the fourth list when a first nonhorizontal edge belonging to this facet is read in the first list or else when a first end of a horizontal edge belonging to this facet is read in the first list; and this same facet then being removed from the fourth list when a second nonhorizontal edge belonging to this facet is read in the first list, or else when second end of a horizontal edge belonging to this facet is read in the first list;

comparing the priority of each edge having its first end on the current line with the priority of each facet contained in the fourth list in its state corresponding to the edge considered, and then counting the number of facets present on the fourth list and having a priority greater than that of the edge considered.

7. A process according to claim 1, wherein arranging the list of points of intersection between the first and second edge end comprises the steps of:

calculating, for each intersection point, the value of a parameter, which is proportional to the distance between the intersection point and the second end of the edge, as a function of the coordinates of the two ends of the edges having an interseciton, and as a function of their slopes;

determining the order of intersections by comparing the value of this parameter for all the intersection points of the edge; and calculating the ordinate and abscissa of each intersection point from the value of said parameter calculated for this intersection.

* * * * *

UNITED STATES PATENT AND TRADEMARK OFFICE
CERTIFICATE OF CORRECTION

PATENT NO. : 5,125,074

DATED : June 23, 1992

INVENTOR(S) : Labeaute Et Al

It is certified that error appears in the above-identified patent and that said Letters Patent is hereby corrected as shown below:

```
Column 1, line 32, change "bas" to --has--.

Column 3, line 65, change "IS" to --I3--;

line 66, change "IS" to --I3--;

line 67, change "IS" to --I3--.

Column 6, line 13, change "IS" to --I3--
```

Signed and Sealed this

Second Day of November, 1993

Attest:

BRUCE LEHMAN

*Attesting Officer*      *Commissioner of Patents and Trademarks*